Patented Dec. 5, 1933

1,938,320

UNITED STATES PATENT OFFICE 1,938,320

MANUFACTURE OF DRYING OILS AND RESINS

Samuel M. Cooper, Pittsburgh, Pa., assignor to Gulf Refining Company, Pittsburgh, Pa., a corporation of Texas No Drawing. Application May 21, 1931
Serial No. 539,142

11 Claims. (Cl. 134—56)

This invention relates to the manufacture of drying oils and resins; and it comprises a process of reacting turpentine or certain fractions thereof with anhydrous aluminum chloride, the reaction being advantageously carried out at low reaction temperatures and in a solvent medium comprising an enert solvent or a mixture of inert solvents, the composition of the solvent medium being regulated to control the speed of the reaction and the properties of the resulting products; the products formed by said reaction being recovered from the reaction mixture by distilling off the solvent medium together with any unreacted turpentine, this being accomplished advantageously under conditions of reduced pressure; and it also comprises certain products obtained by the described method, these products having the properties of drying oils or resins; all as more fully hereinafter set forth and as claimed.

Although the modern lacquer art has advanced tremendously within the past decade due to the discovery and use of various new solvents, plasticizers and the like, the range of suitable drying oils for lacquer compositions has remained rather limited. The only widely used drying oils now available are the natural glycerides, such as linseed oil, China wood oil, poppy oil, etc., which have long been known. These are not miscible in many of the modern lacquer compositions.

Although much time and effort has been spent in experimental work, there have been produced but few suitable artificial drying oils by chemical reactions. One of the most interesting of the newly developed methods is the polymerization of such pine extracts as pine oil and spirits of turpentine by the aid of various catalysts either in the vapor or liquid phase. The residues obtained after distilling off the low boiling products are said to be suitable for use as drying oils. The products produced by this method, however, have several important disadvantages. They apparently consist of a large range of different polymers of various viscosities, boiling points and other properties. The composition of these products is consequently not homogeneous. When submitted to fractional distillation, some improvement is effected, but in this case the yield of the products suitable for use as drying oils is limited. The heavier residues partake more of the nature of resins or tars, while the lighter fractions do not dry properly. The products produced are dark colored before fractionation and the final residue obtained after fractional distillation is still darker in color. The reason that better products have not been obtained by these prior methods is probably to be found in the fact that the reaction with the catalyst has not been controlled in any manner, his resulting in the production of all types of polymers ranging from the unreacted turpentine to a tar, without the formation of a satisfactory yield of any one polymer.

It has now been found that the above described process can be greatly improved by suitable alterations in the method of conducting the reaction. For example, it is advantageous to employ a distillate of the pine extracts, such as turpentine, in place of the crude spirits of turpentine etc. previously employed in this reaction. A suitable cut may be obtained, for example, by distilling crude spirits of turpentine until approximately 90 per cent of the turpentine is recovered as distillate. Reduced pressures may be employed. It is probable that the fractions obtained from turpentine in this manner are mainly alpha and beta pinenes, which form the principal constituents of German and American oil of turpentine; other constituents may be dipentene, sylvestrene, etc. While such pine extracts as pine oil, dipentene, sylvestrene and the like, and various fractions of the same are suitable, turpentine itself or certain cuts thereof produce products somewhat more satisfactory for use as drying oils. The higher boiling pine extracts produce heavier resinous compositions having properties approaching tars. By the term "pine extracts" is meant the various oleo-resins extracted from pine and spruce woods and more especially the products mentioned previously.

It has also been found that the reaction with the catalyst is advantageously conducted in a controlled solvent medium. The solvents used are substantially inert and tend to stabilize and to reduce the rate of reaction, which can therefore be suitably controlled by choice of the solvent mixture. The reaction, when carried out in this manner, produces a homogeneous product, the range of polymers formed being small. The total amount of polymerization produced can be regulated to some extent by the time allowed for reaction and chiefly by the temperature of the reacting mixture. The use of the inert solvent as a reaction medium appears to be an important improvement in the process. Even crude spirits of turpentine will give a drying oil product in satisfactory yield. But an improvement in the color and in the amount of the product is noted when a low boiling fraction of the turpentine is used, as previously suggested.

In recovering the drying oil from the reaction mixture, after the removal of the aluminum chloride, it has been found advantageous to distill off the solvent medium and the unreacted material under vacuum conditions. A more homogeneous and a lighter colored product results. It is evident from the result of various experiments that, when the temperatures of the turpentine, or of the reaction mixtures or of the drying oil products are raised above certain points, certain deleterious side reactions take place which produce colored products. It is advantageous to avoid these reactions by maintaining the temperatures at low values throughout. If the temperature of the reaction mixture with aluminum chloride is kept low, say not over 30° C., and of the subsequent distillation not much over 100° C., suitable light colored products result without the need of final fractionation. But if temperatures below 0° C. are used during the polymerization the rate of reaction becomes somewhat too slow to be commercial. Temperatures above 50° C. during the reaction are to be avoided if a drying oil product is desired.

In the present process a considerable range of solvents are available. Different solvents produce different rates of reaction. For example, naphtha appears to produce an extremely slow rate of reaction, carbon tetrachloride produces a moderate rate, while in ethylene dichloride the rate of reaction is considerably accelerated. Mixtures of these solvents produce intermediate rates of reaction. Other solvent mixtures containing chloroform, carbon bisulfide, benzene and chlorinated hydrocarbon compounds are suitable. The solvent employed may be varied to suit the product which is being polymerized.

While the prior art has described the use of various types of catalysts in polymerizing turpentine, such as fuller's earth, metallic chlorides, aluminum oxides, silicious earth, etc., it has been found that aluminum chloride is by far the most effective and suitable for the present purpose. Other metallic chloride catalysts, such as ferric chloride and zinc chloride are applicable, however. The aluminum chloride used must be anhydrous. Only a small amount is required. On the average it is satisfactory to use about 2 to 5 per cent by weight, based on the weight of the turpentine.

The present process can be carried out either continuously or by the batch method. In the continuous process a mixture of aluminum chloride, inert solvent and turpentine or a fraction thereof is fed through a coil of pipe where it is held at a desired temperature, say from 0° to 30° C. The rate of feed is governed in such manner that the reaction is substantially completed by the time the mixture reaches the end of this coil of pipe. The mixture then flows into an enlarged chamber where it is washed with water or dilute hydrochloric acid to decompose the aluminum chloride complex and to remove the undesired reaction products. After separating the aqueous layer the mixture is filtered to remove materials of the nature of precipitated aluminum hydroxide. It is then introduced into a still which is advantageously maintained under reduced pressure, the inert solvent and any unconverted turpentine being distilled from the residue which collects in the lower portion of the still. The drying oil residue may be tapped off at intervals or continuously from the lower part of the still.

In a specific embodiment of a batch process which falls within the purview of the present invention, 125 pounds of inert solvent may be taken, which solvent may comprise ethylene dichloride, for example. To this may be added 85 pounds of a distilled cut representing approximately 90 per cent of crude spirits of turpentine. To this mixture may be added 3 pounds of anhydrous aluminum chloride. The mixture is stirred at a temperature of from 0° to 30° C. for about 30 minutes. It is convenient to use a container in the nature of a still during the reaction. After the reaction is completed, a small amount of water, for example 25 pounds, is added to "kill" the residual activity of the aluminum chloride. The aqueous layer is separated completely and the oil layer, after filtering, is heated in a vacuum still in order to distill off the ethylene dichloride and unconverted hydrocarbons, leaving behind a residue of the drying oil product. The solvent recovered by the vacuum distillation may be reused in the next operation.

Ethylene dichloride appears to be a solvent particularly suited for my purpose. The aluminum chloride complex formed therein is completely soluble throughout the course of the chemical reaction when this solvent is employed. The rate of action is high but, if the temperature is maintained below about 10° C., the reaction can be controlled to give a satisfactory product.

The drying oil produced by the above described process is an almost colorless, clear and sparkling product. At room temperature it is semi-solid and has a boiling range somewhat above 100° C. at 30 mm. pressure. The yield obtained in one run carried out by the above method was about 50 per cent. The product is miscible with such varied solvents as benzene, turpentine, carbon tetrachloride, petroleum naphtha and the ordinary ethers, but is insoluble in 95 per cent ethyl alcohol. It dissolves resins and caoutchouc and can be mixed with most of the ordinary oil paints, modern nitrocellulose lacquers, oil varnishes and the like. My products are satisfactorily miscible with the solvents employed in the modern nitrocellulose lacquers. This miscibility is highly important in the production of lacquers for special purposes. The product, when applied to a surface, dries more rapidly than linseed oil to a clear, hard and somewhat brittle film.

What I claim is:

1. In the manufacture of drying oils and resins from pine extracts, the process which comprises reacting such an extract with aluminum chloride in the presence of an inert solvent at temperatures below 50° C., distilling off the said solvent and any unreacted turpentine and recovering a drying oil from the residue.

2. In the manufacture of drying oils and resins from pine extracts, the process which comprises distilling turpentine to recover approximately 90 per cent in the distillate and reacting the said distillate in the liquid phase with aluminum chloride in the presence of an inert solvent.

3. In the manufacture of drying oils and resins from pine extracts, the process which comprises distilling turpentine to recover approximately 90 per cent in the distillate and reacting the said distillate with aluminum chloride in the liquid phase in the presence of an inert solvent, distilling off the said solvent and any unreacted turpentine and recovering a drying oil from the residue.

4. In the manufacture of drying oils and resins from pine extracts, the process of claim 3 in which water is added to the reaction products before the final distillation.

5. In the manufacture of drying oils and resins from pine extracts, the process of claim 3 in which water is added to the reaction products, which are then filtered to remove precipitated aluminum hydroxide, before the final distillation.

6. In the manufacture of drying oils and resins from pine extracts, the process which comprises distilling turpentine to recover approximately 90 per cent in the distillate and reacting the said distillate with aluminum chloride in the presence of an inert solvent and at temperatures from 0° to 30° C., distilling off the said solvent and any unreacted turpentine under reduced pressure and recovering a drying oil from the residue.

7. The process of claim 1 in which the inert solvent comprises ethylene dichloride.

8. As a new composition of matter, a drying oil comprising a reaction product of turpentine and aluminum chloride produced in the liquid phase in an inert solvent and at low temperatures, being a homogeneous, clear, highly viscous liquid with a boiling range above 100° C. at 30 mm. pressure and drying to a clear, hard film when applied to a surface.

9. In the manufacture of drying oils from pine extracts, the process which comprises reacting said pine extracts with anhydrous aluminum chloride in the presence of an inert solvent and at temperatures below 50° C., adding water to deactivate the aluminum chloride and distilling off a drying oil product under vacuum conditions, the temperature during said distillation being allowed to rise not much above 100° C.

10. In the manufacture of drying oils and resins from pine extracts, the process which comprises reacting such an extract with a metallic chloride at low temperatures in the liquid phase and in the presence of an inert solvent, adding water to the reaction mixture, distilling off the said solvent and any unreacted pine extract and recovering a drying oil from the residue.

11. The process of claim 1 wherein the pine extract reacted with aluminum chloride is selected from a class consisting of pine oil, turpentine, dipentene and sylvestrene.

SAMUEL M. COOPER.